(12) United States Patent
Johnson

(10) Patent No.: US 7,877,980 B2
(45) Date of Patent: Feb. 1, 2011

(54) CONVERTIBLE GAS TURBINE ENGINE

(75) Inventor: James Edward Johnson, Fairfield, OH (US)

(73) Assignee: General Electric Company, Schenectady, NY (US)

( * ) Notice: Subject to any disclaimer, the term of this patent is extended or adjusted under 35 U.S.C. 154(b) by 971 days.

(21) Appl. No.: 11/617,371

(22) Filed: Dec. 28, 2006

(65) Prior Publication Data
US 2008/0155961 A1 Jul. 3, 2008

(51) Int. Cl.
F02K 3/02 (2006.01)
(52) U.S. Cl. ..................................... 60/226.1
(58) Field of Classification Search .............. 60/226.3, 60/226.1, 39.15, 224
See application file for complete search history.

(56) References Cited

U.S. PATENT DOCUMENTS

| 3,368,352 A * | 2/1968 | Hewson ........................ 60/224 |
| 4,149,374 A * | 4/1979 | Barchenko ................... 60/225 |
| 4,424,666 A * | 1/1984 | Woody ......................... 60/790 |
| 4,527,388 A | 7/1985 | Wallace, Jr. |
| 4,537,026 A | 8/1985 | Nightingale |
| 4,791,783 A * | 12/1988 | Neitzel ........................ 60/262 |
| 5,079,916 A | 1/1992 | Johnson |
| 5,404,713 A * | 4/1995 | Johnson ....................... 60/204 |
| 5,694,766 A | 12/1997 | Smereczniak et al. |
| 5,809,772 A * | 9/1998 | Giffin et al. ................. 60/226.1 |
| 2005/0109012 A1 * | 5/2005 | Johnson ..................... 60/226.1 |

FOREIGN PATENT DOCUMENTS

GB 2400411 * 10/2004

* cited by examiner

Primary Examiner—Michael Cuff
Assistant Examiner—Andrew Nguyen
(74) Attorney, Agent, or Firm—Adams Intellectual Property Law; David L. Narciso, Esq.

(57) ABSTRACT

A gas turbine engine includes a turbomachinery core operable to generate a flow of pressurized combustion gases at a variable flow rate, while maintaining a substantially constant core pressure ratio; a rotating fan disposed upstream of the core, the fan adapted to extract energy from the core and generate a first flow of air which is compressed at a first pressure ratio; and at least a first bypass duct surrounding the core downstream of the fan adapted to selectively receive at least a first selected portion of the first flow which is compressed at a second pressure ratio lower than the first pressure ratio, and to bypass the first selected portion around the core, thereby varying a bypass ratio of the engine. The fan is adapted to maintain a flow rate of the first flow substantially constant, independent of the bypass ratio.

8 Claims, 7 Drawing Sheets

CONVERTIBLE GAS TURBINE ENGINE

BACKGROUND OF THE INVENTION

This invention relates generally to gas turbine engines and more particularly to a turbofan engine in which the fan flow can be modulated independent of the fan speed.

Future mixed mission morphing aircraft as well as more conventional mixed mission capable military systems that have a high value of take-off thrust/take-off gross weight, i.e., a thrust loading in the 0.8-1.2 category, present many challenges to the propulsion system. They need efficient propulsion operation at diverse flight speeds, altitudes, and particularly at low power settings where conventional engines operate at inefficient off-design conditions both in terms of uninstalled performance and, to an even greater degree, fully installed performance that includes the impact of spillage drag losses associated with supersonic inlets.

When defining a conventional engine cycle and configuration for a mixed mission application, compromises have to be made in the selection of fan pressure ratio, bypass ratio, and overall pressure ratio to allow a reasonably sized engine to operate effectively at both subsonic and supersonic flight conditions. In particular, the fan pressure ratio and related bypass ratio selection needed to obtain a reasonably sized engine capable of developing the thrusts needed for combat maneuvers and supersonic operation are non-optimum for efficient low power subsonic flight. Basic uninstalled subsonic engine performance is compromised and fully installed performance suffers even more due to the inlet/engine flow mismatch that occurs at reduced power settings.

BRIEF SUMMARY OF THE INVENTION

The above-mentioned shortcomings in the prior art among others are addressed by the present invention, which according to one aspect provides a gas turbine engine, including: a turbomachinery core operable to generate a flow of pressurized combustion gases at a variable flow rate, while maintaining a substantially constant core pressure ratio; a rotating fan disposed upstream of the core, the fan adapted to extract energy from the core and generate a first flow of air which is compressed at a first pressure ratio; and at least a first bypass duct surrounding the core downstream of the fan adapted to selectively receive at least a first selected portion of the first flow which is compressed at a second pressure ratio lower than the first pressure ratio, and to bypass the first selected portion around the core, thereby varying a bypass ratio of the engine. The fan is adapted to maintain a flow rate of the first flow substantially constant, independent of the bypass ratio.

According to another aspect of the invention, a gas turbine engine includes: a first turbomachinery core operable to generate a flow of pressurized combustion gases at a first design flow rate; a second turbomachinery core operable to generate a flow of pressurized combustion gases at a second design flow rate substantially greater than said first flow rate; a low pressure turbine disposed downstream of the first and second cores and adapted to extract energy from at least one of the cores; a rotating fan disposed upstream of the first and second cores and adapted to be mechanically driven by the low pressure turbine to generate a first flow of air which is compressed at a first pressure ratio; and means for selectively ducting a portion of the first flow of air through one of the cores to the low pressure turbine.

According to another aspect of the invention, a method of operating a gas turbine engine includes: burning a fuel in at least one turbomachinery core to produce a first flow of pressurized combustion gases; extracting energy from the first flow of pressurized combustion gases and using the energy to generate a first flow of pressurized air with a rotating fan, wherein the first flow is compressed at a first pressure ratio; passing a first portion of the first flow through the at least one core; and bypassing at least a selected, variable second portion of the first flow around the at least one core through a first bypass duct, resulting in the engine operating at a selected bypass ratio; wherein a total flow rate of the first flow is maintained substantially constant regardless of the bypass ratio, and wherein an operating pressure ratio of the engine remains substantially constant during engine operation.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
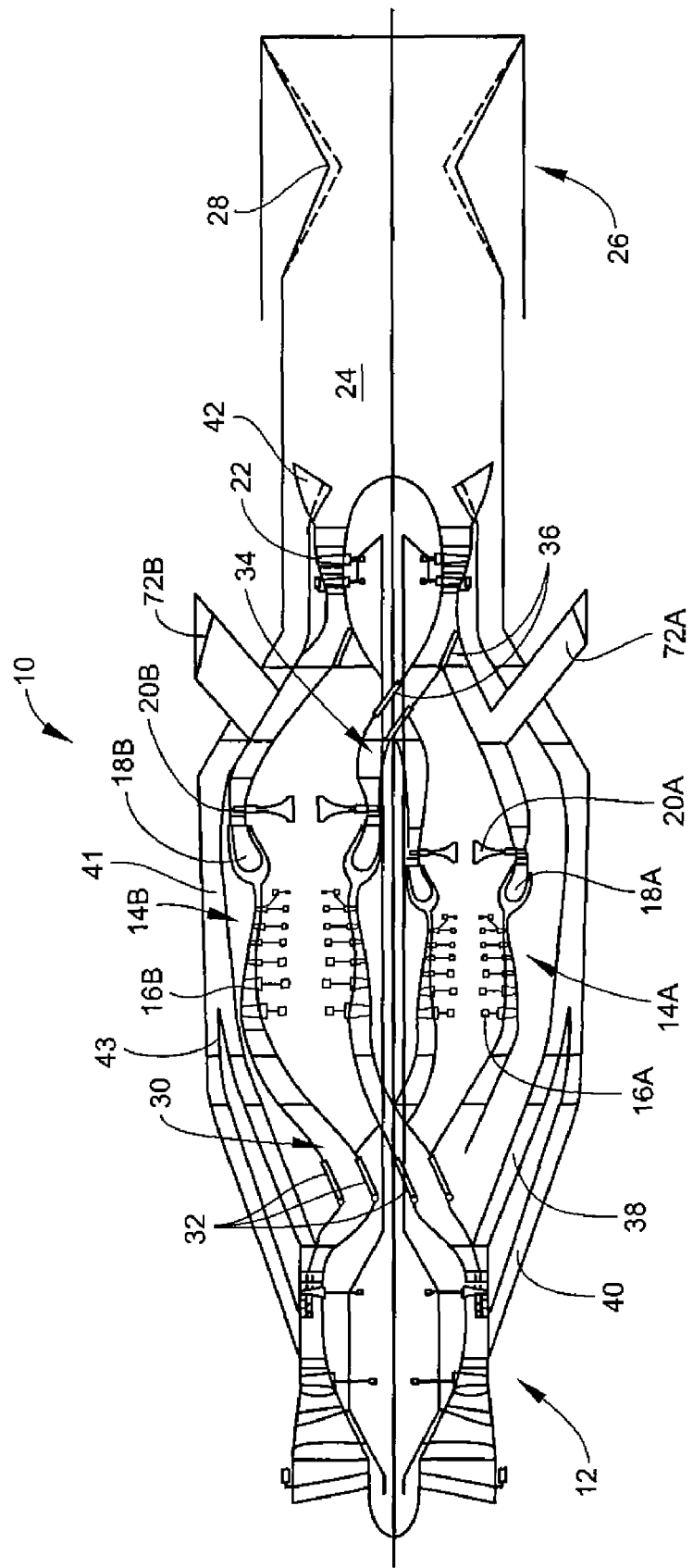
FIG. 1 is a schematic cross-sectional view of a convertible gas turbine engine constructed according to an aspect of the present invention.

Referring to the drawings wherein identical reference numerals denote the same elements throughout the various views, FIG. 1 illustrates a portion of an exemplary convertible gas turbine engine, generally designated 10. The engine 10 has a fan 12, a first core 14A including a first compressor 16A, first combustor 18A, and first high pressure turbine 20A, and a second core 14B which includes a second compressor 16B, second combustor 18B, and second high pressure turbine 20B. The fan 12 is driven by a low pressure turbine 22 disposed downstream of the cores 14A and 14B. The cores 14A and 14B can optionally have the same design pressure ratios, but have different design flow rates, with the second core 14B having a higher design and maximum flow. An exhaust duct 24 is disposed downstream of the low pressure turbine 22, and a convergent-divergent exhaust nozzle 26 is disposed downstream of the exhaust duct 24. The throat 28 of the exhaust nozzle 26 may have a variable area "A8", and if desired an afterburner (not shown) may be incorporated upstream of the exhaust nozzle 26.

Core inlet ducting 30 provides a flow path between the fan 12 and the first and second cores 14A and 14B. The core inlet ducting 30 is provided with inlet flow control flaps 32 that permit the fan flow to be selectively ducted to either the first core 14A or the second core 14B. Similarly, core outlet ducting 34 provides a flow path between the first and second cores 14A and 14B and the low pressure turbine 22. The core outlet ducting 34 is provided with outlet flow control flaps 36 that permit the low pressure turbine 22 to be selectively connected to either the first core 14A or the second core 14B.

An inner bypass duct 38 surrounds the cores 14A and 14B and forms a flowpath from the fan 12 to the exhaust duct 24. An outer bypass duct 40 surrounds the inner bypass duct 38 and forms a second, separate flowpath between the fan 12 and the exhaust duct 24. The inner and outer bypass ducts 38 and 40 merge downstream of the fan 12 to form a single main bypass duct 41. A front mixer 43 is disposed at the juncture of the core and bypass duct flow streams to promote efficient mixing of the two streams. If needed, the front mixer 43 may be of the type which can selectively vary its open area, This type of mixer is sometimes referred to as a variable area bypass injector ("VABI"). A mixer 42 (for example a lobed or chute-type mixer) is disposed downstream of the low pressure turbine 22, at the juncture of the core and bypass duct flow streams, to promote efficient mixing of the two streams. The mixer 42 may also be a VABI, which can be used to control the back pressure on the fan 112.

Figure 2A:
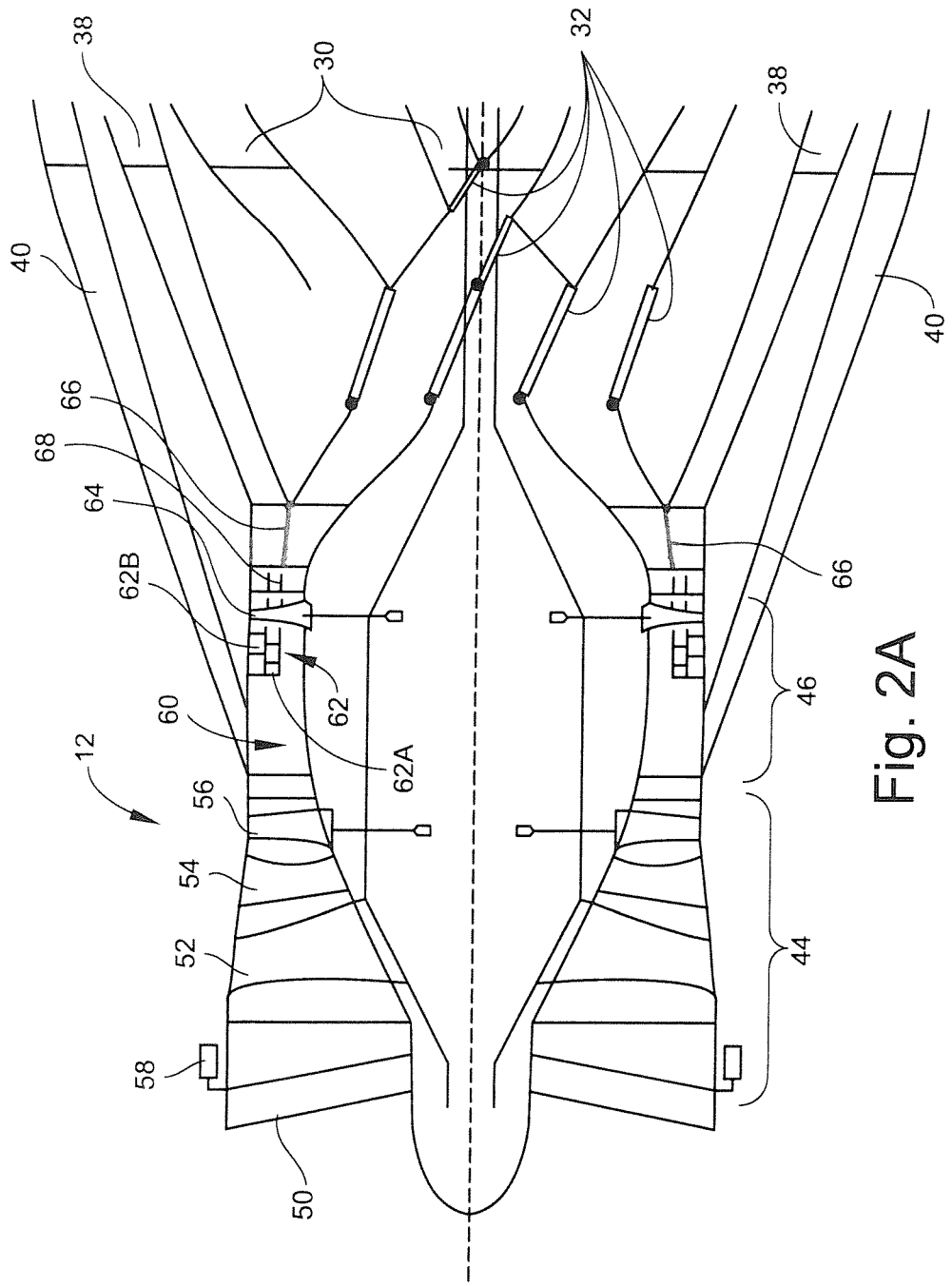
FIG. 2A is an enlarged portion of FIG. 1, showing a fan of the engine of FIG. 1 in a partial power operating mode.
Figure 2B:
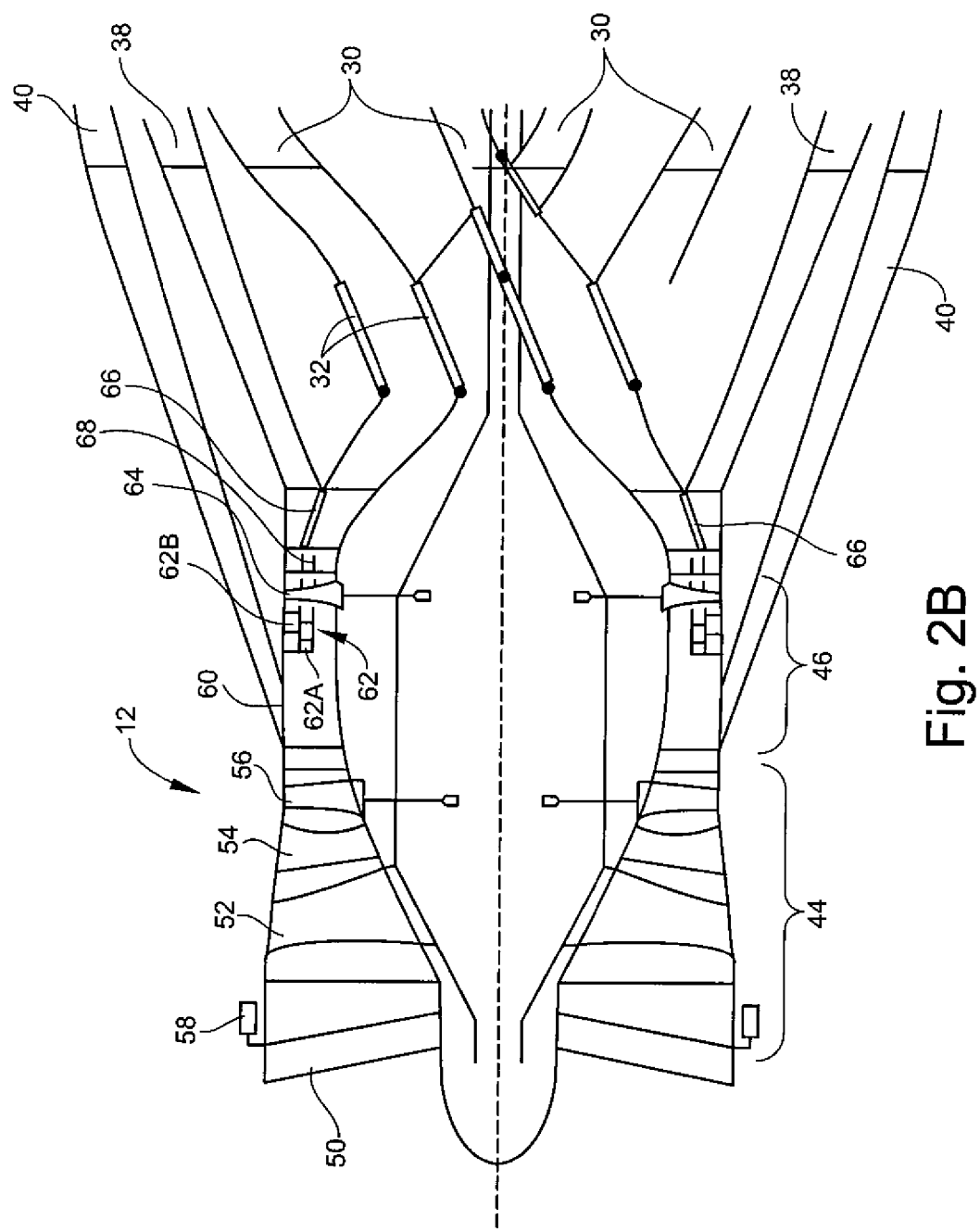
FIG. 2B is an enlarged portion of FIG. 1, showing a fan of the engine of FIG. 1 in a maximum power operating mode.

The fan 12, shown in more detail in FIGS. 2A and 2B, is of a "convertible" type. The pressure ratio of the flow discharged into the bypass duct (i.e. the fan tip overall PR) can be varied while core supercharge pressure ratio is maintained and the total mass flow rate of the fan 12 is held constant. For purposes of explanation the fan 12 is considered to include a "primary section" 44 and "secondary section" 46, both contained within a fan duct 48. The exact number of fan stages in each section, the design pressure ratio of the individual sections, and other design characteristics may be varied to suit a particular application. In the illustrated example, The primary section 44 includes, in flow sequence, a row of non-rotating fan inlet guide vanes or "IGVs" 50, a first stage of rotating fan blades 52, a row of non-rotating interstage vanes 54, and a second stage of rotating fan blades 56. The inlet guide vanes 50 may have their angle of attack with respect to the airflow and their open flow area selectively changed by using an actuator 58 of a known type. Optionally, the interstage vanes 54 may have their angle of attack with respect to the airflow and their open flow area selectively changed by using an actuator of a known type (not shown).

The outer bypass duct 40 is connected to the fan duct 48 between the primary section 44 and the secondary section 46. A mode control valve 60 may be selectively moved between an open position, in which a portion of the discharge from the primary section 44 can flow into the outer bypass duct 40, and a closed position, in which all of the discharge from the forward portion flows into the secondary section 46.

The secondary section 46 includes, in flow sequence, a row of non-rotating secondary guide vanes 62 with radially inner and outer sections 62A and 62B, and a stage of rotating fan blades 64. Independent of each other, the inner and outer sections 62A and 62B of the secondary guide vanes 62 may have their angle of attack with respect to the airflow and their open flow area selectively changed by using an actuator of a known type (not shown).

A fan flow control flap 66 is positioned downstream of the secondary section 46 and serves to selectively alter the proportion of fan discharge flow between the core inlet ducting 30 and the inner bypass duct 38. In conjunction with a stationary splitter structure 68, the fan flow control flap 66 effectively divides the discharge flow of the secondary section 46 into radially inner, center, and outer streams. In a "low flow" position, i.e. a high bypass mode, shown in FIG. 2A, the inner stream is passed to the core inlet ducting 30, while the center and outer streams pass to the inner bypass duct 38. In a "high flow" position, i.e. a low bypass mode, shown in FIG. 2B, the inner and center streams pass to the core inlet ducting 30, while the outer stream passes to the inner bypass duct 38. The portion of the total fan flow entering one or both of the bypass ducts 38 or 40 is referred to as the "bypass flow", while the remainder is referred to as the "core flow".

The convertible engine 10 operates in one of two modes. In a first mode, intended for partial-power operation, the second core 14B is shut off. The core flow from the inner stream is passed to the core inlet ducting 30, while the center and outer streams pass to the inner bypass duct 38. The mode control valve 60 is open and a portion of the flow from the primary section 44 of the fan 12 flows through the outer bypass duct 40. The flow split between the inner and outer bypass ducts 38 and 40 can be modulated by varying the position of the secondary guide vanes 62. The inlet flow control flaps 32 duct the core flow to the first core 14A. The core flow is pressurized by the first compressor 16A, mixed with fuel in the first combustor 18A, and ignited, thereby generating pressurized combustion gases. Some work is extracted from these gases by the first high pressure turbine 20A which drives the second compressor 16B via a shaft (not shown). The outlet flow control flaps 36 connect the first core 14A to the low pressure turbine 22, which in turn drives the fan 12 via an inner shaft 70. This mode of operation is termed "double bypass" and has a relatively low fan pressure ratio and high bypass ratio.

In a second mode, intended for maximum-power operation, the first core 14A is shut off. The flow from the inner and center streams are passed to the core inlet ducting 30, while the outer stream passes to the inner bypass duct 38. The mode control valve 60 is closed. The flow split between the inner bypass duct 38 and the core flow can be modulated by varying the position of the guide vanes 62. The inlet flow control flaps 32 duct the fan flow to the second core 14B. The core flow is pressurized by the second compressor 16B, mixed with fuel in the second combustor 18B, and ignited, thereby generating pressurized combustion gases. Some work is extracted from these gases by the second high pressure turbine 20B which drives the second compressor 16B via a shaft (not shown). The outlet flow control flaps 36 connect the second core 14B to the low pressure turbine 22, which in turn drives the fan 12 via an inner shaft 70. This mode of operation is termed "single bypass" and has a relatively high fan pressure ratio and low bypass ratio.

Means are provided for effecting a changeover between the first and second cores 14A and 14B while the engine 10 operates continuously. As illustrated in FIG. 1, the first and second cores 14A and 14B are provided with first and second core exhaust ducts 72A and 72B, respectively, operated by shutoff valves 74A and 74B. Means are also provided for supplying intake air to the "inactive" core, for example through the core inlet ducting 30. In practice, when one core is operating and it is desired to change modes, the other core would be started and brought up to operating speed, then the core flow from the fan would be switched over to that core, and finally the previously "active" core would be shut down until required again.

Figure 3:
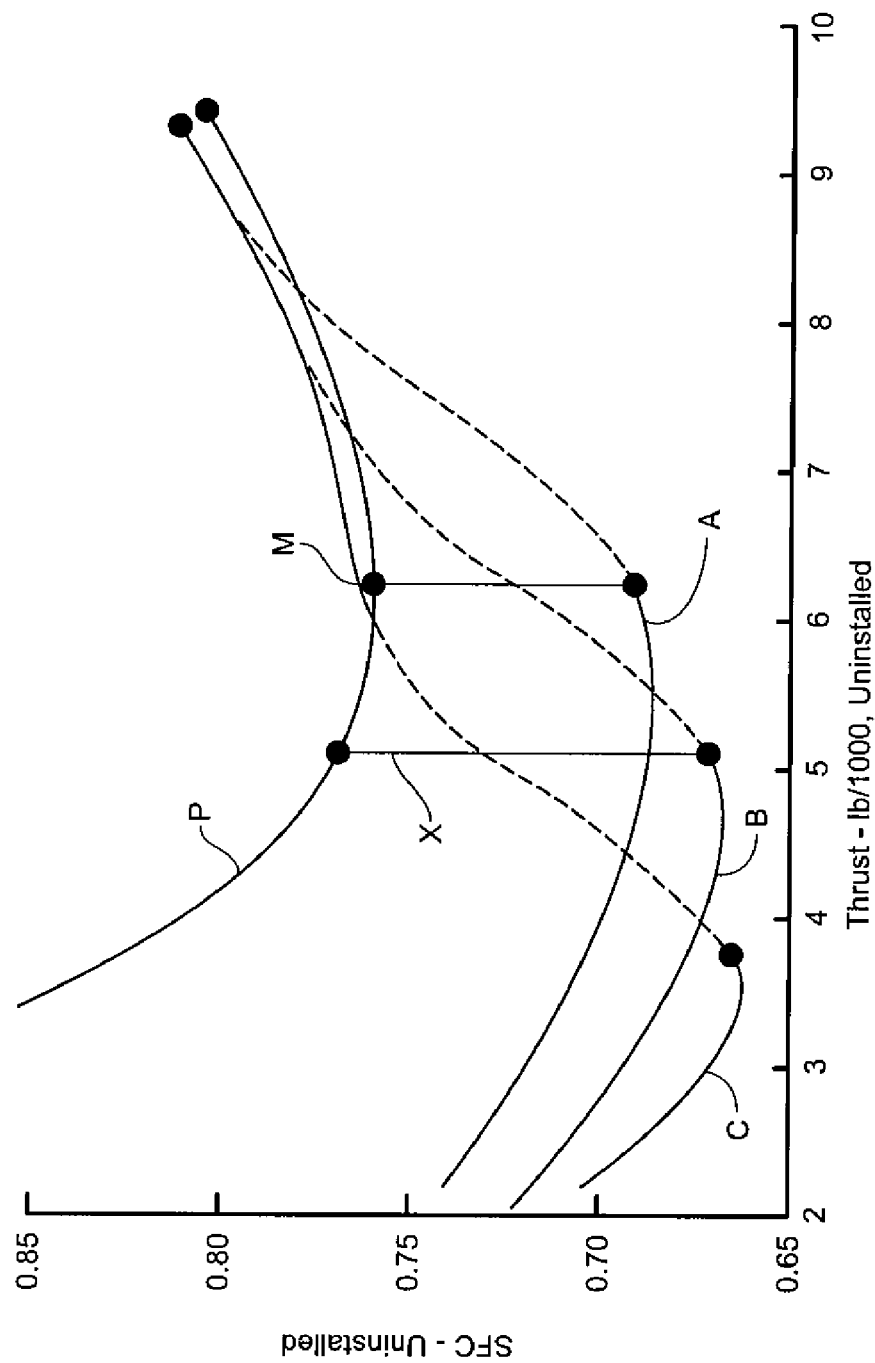
FIG. 3 is a graph depicting a specific fuel consumption versus thrust characteristic of a gas turbine engine of the present invention compared to a prior art gas turbine engine.

FIG. 3 illustrates schematically the differences in the operation of the engine 10 as compared to a prior art gas turbine engine. The prior art Brayton-cycle engine shows a trough-shaped plot (indicated at "P") of specific fuel consumption (SFC) versus thrust, with higher SFCs occurring at thrust levels higher or lower than a design point minimum (labeled "M"). For an aircraft which needs to operate over a wide speed range, it is possible that the required cruise thrust could be well below the "design point" of the engine, causing the resultant SFC (intersecting the line labeled "X") to be much higher than desired. This characteristic makes it difficult to design a single engine having high fuel efficiency at both high and low speeds.

Plot B of FIG. 3 illustrates a theoretical model of the operation of a convertible engine 10 as described above. Maximum power would be the same as for the prior art engine, with the same maximum fan flow and fan overall pressure ratio (i.e. the pressure at the exit of the fan secondary section 46 divided by the pressure upstream of the fan 12). At high thrust levels, the engine 10 operates in "single bypass" mode as described above, and the right-hand portion of the SFC curve is essentially the same as the prior art engine. When reduced power is required, for example for long-range cruising flight, the convertible engine 10 may be operated in "double bypass" mode, maintaining a constant total fan flow rate, reducing the fan overall pressure ratio in the bypass duct, maintaining a constant core pressure ratio (i.e. the pressure at the combustor inlet divided by the pressure upstream of the compressor 16) and a constant overall pressure ratio (i.e. the pressure at the combustor inlet divided by the pressure upstream of the fan 12), and increasing the bypass ratio. In this condition, the pressure ratio across the fan 12 entering the core 14, referred to as the "hub pressure ratio" or "core supercharge", remains as the same value as for maximum power. In this operating regime, the convertible engine 10 follows a much lower SFC curve, with a substantial reduction in fuel consumption over the prior art engine at the same reduced thrust level, as shown at the point where curve B intersects line X.

It is noted that the pressure ratio "split" of the primary and secondary sections 44 and 46 of the fan 12 may be varied to suit a particular design requirement for reduced power operation while maintaining the same design overall fan pressure ratio, and thus the same thrust and SFC at maximum power. For example, the convertible engine shown at plot "B" has a primary section pressure ratio slightly greater than the secondary section pressure ratio. An alternative engine shown at plot "A" may have a higher primary section pressure ratio, with minimum SFC achieved at a higher thrust level, while another alternative engine "C" may have a lower primary section pressure ratio, achieving minimum SFC at a lower thrust level.

Figure 4:
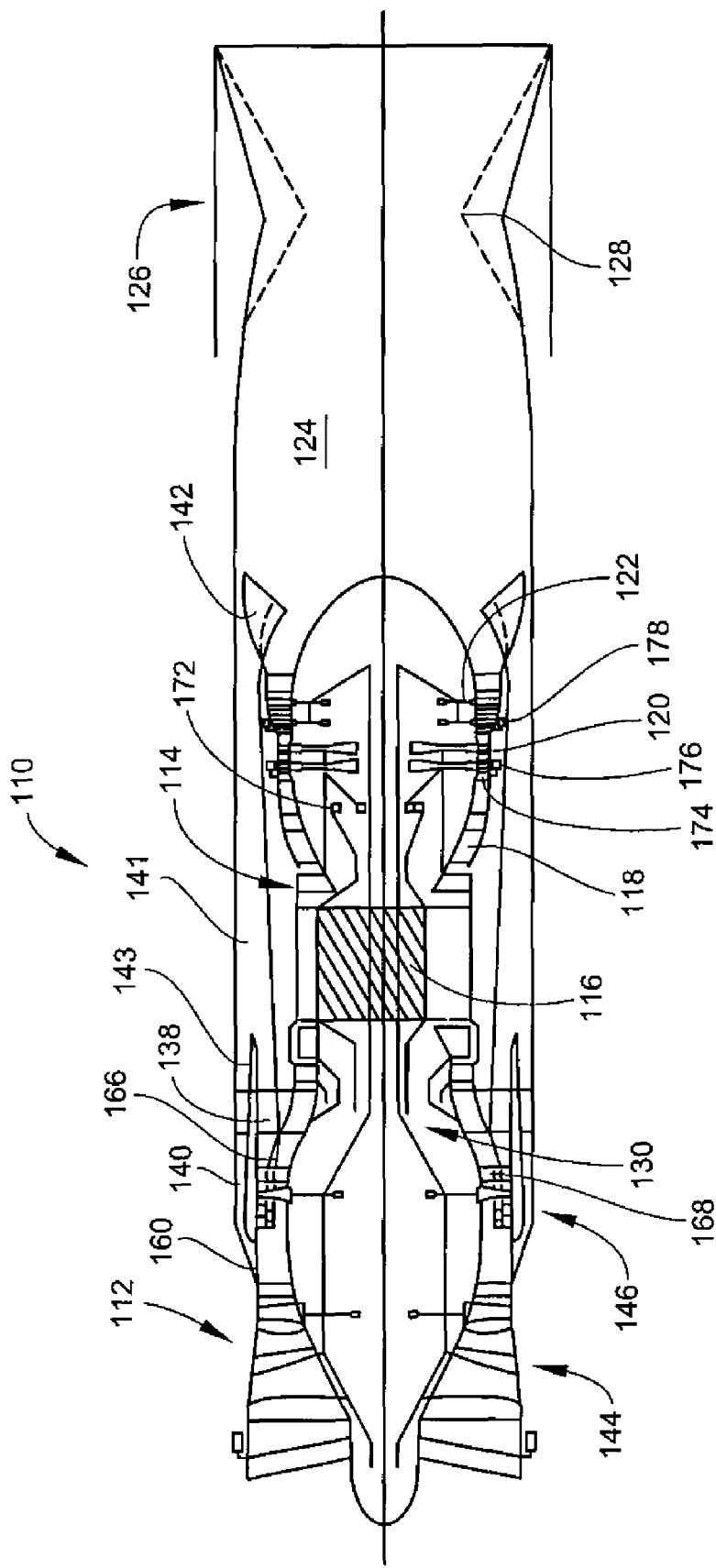
FIG. 4 is a schematic cross-sectional view of a gas turbine engine constructed according to another aspect of the present invention.

The operating principles of the convertible engine 10 may be embodied in a number of different physical configurations. For example, FIG. 4 illustrates an alternative convertible engine 110 having a fan 112, a core 114 including a compressor 116, combustor 118, and high pressure turbine 120. The fan 112 is driven by a low pressure turbine 122 disposed downstream of the core 114. An exhaust duct 124 is disposed downstream of the low pressure turbine 122, and a convergent-divergent exhaust nozzle 126 is disposed downstream of the exhaust duct 124. The throat 128 of the exhaust nozzle 126 may have a variable area "A8", and if desired an afterburner (not shown) may be incorporated upstream of the exhaust nozzle 126.

Core inlet ducting 130 provides a flow path between the fan 112 and the core 114. An inner bypass duct 138 surrounds the core 114A and forms a flowpath from the fan 112 to the exhaust duct 124. An outer bypass duct 140 surrounds the inner bypass duct 138 and forms a second, separate flowpath between the fan 112 and the exhaust duct 124. The inner and outer bypass ducts 138 and 140 merge downstream of the fan 112 to form a single main bypass duct 141. A front mixer 143 is disposed at the juncture of the core and bypass duct flow streams to promote efficient mixing of the two streams. If needed, the front mixer 143 may be of the type which can selectively vary its open area. This type of mixer is sometimes referred to as a variable area bypass injector ("VABI"). A mixer 412 (for example a lobed or chute-type mixer) is disposed downstream of the low pressure turbine 22, at the juncture of the core and bypass duct flow streams, to promote efficient mixing of the two streams. The mixer 42 may also be a VABI, which can be used to control the back pressure on the fan 112.

The fan 112 is of a "convertible" type as described above and includes a "primary section" 144 and "secondary section" 146, both contained within a fan duct 148. The exact number of fan stages in each section, the design pressure ratio of the individual sections, and other design characteristics may be varied to suit a particular application.

The outer bypass duct 140 is connected to the fan duct 148 between the primary section 144 and the secondary section 146. A mode control valve 160 may be selectively moved between an open position, in which a portion of the discharge from the primary section 144 can flow into the outer bypass duct 140, and a closed position, in which all of the discharge from the primary section 144 flows into the secondary section 146.

A fan flow control flap 166 is positioned downstream of the secondary section 146 and serves to selectively alter the proportion of fan discharge flow between the core 114 and the inner bypass duct 138. In conjunction with a stationary splitter structure 168, the fan flow control flap 166 effectively divides the discharge flow of the secondary section 146 into radially inner, center, and outer streams. in a "high flow" position, the inner and center streams are passed to the core 114, while the outer stream passes to the inner bypass duct 138. In a "low flow" position, the inner stream passes to the core 114 while the center and outer streams pass to the inner bypass duct 138. The portion of the total fan flow entering one or both of the bypass ducts 138 or 140 is referred to as the "bypass flow", while the remainder is referred to as the "core flow".

The compressor 116 is a positive-displacement pump of a known type, such as a so-called "worm" compressor that includes an inner and outer body compression system. A key aspect of this type of compressor 116, as compared to a prior-art axial-flow turbomachinery compressor, is that it is able to maintain a substantially constant pressure ratio while accommodating varying flow rates. The two-piece compressor 116 is driven by the high pressure turbine 120 and a gearset 172 which maintains the required inner and outer body speed relationship. The high pressure turbine 120 is provided with variable area HPT nozzles (VATN) 174 which may have their open flow area selectively changed by using an actuator 176 of a known type, in order to effectuate a change in the operating speed of the high pressure turbine 120 and compressor 116. The low pressure turbine 122 may also incorporate variable area LPT vanes 178.

The convertible engine 110 operates in one of two modes, in a manner somewhat similar to that of the convertible engine 10 described above. In particular, the operation of the convertible fan 112 is identical to that of the fan 12. In "double bypass" mode, intended for partial-power operation, the core flow from the inner stream is passed to the core 114, while the center and outer streams pass to the inner bypass duct 138. The mode control valve 160 is open and a portion of the flow from the primary section 144 of the fan 112 flows through the outer bypass duct 140. The flow split between the inner and outer bypass ducts 138 and 140 can be modulated by varying the position of the secondary guide vanes 162. The inlet flow control flaps 132 duct the core flow to the core 114. The variable area HPT nozzles 174 are closed as needed as the speed and flow of the compressor 116 are reduced, and the mixer 142 and/or variable area LPT vanes 178 are adjusted as necessary. The unique worm compression system maintains constant core pressure ratio as flow is reduced, effectively operating as a continuous family of individual compressor sizes.

In "single bypass" mode, intended for maximum-power operation, the flow from the inner and center streams are passed to the core 114, while the outer stream passes to the inner bypass duct 138. The mode control valve 160 is closed. The flow split between the inner bypass duct 138 and the core flow can be modulated by varying the position of the guide vanes 162. The variable area HPT nozzles 174 are fully open so that the compressor 116 operates at full speed. The mixer 142 and variable are LPT vanes 178 are fully open.

Figure 5:
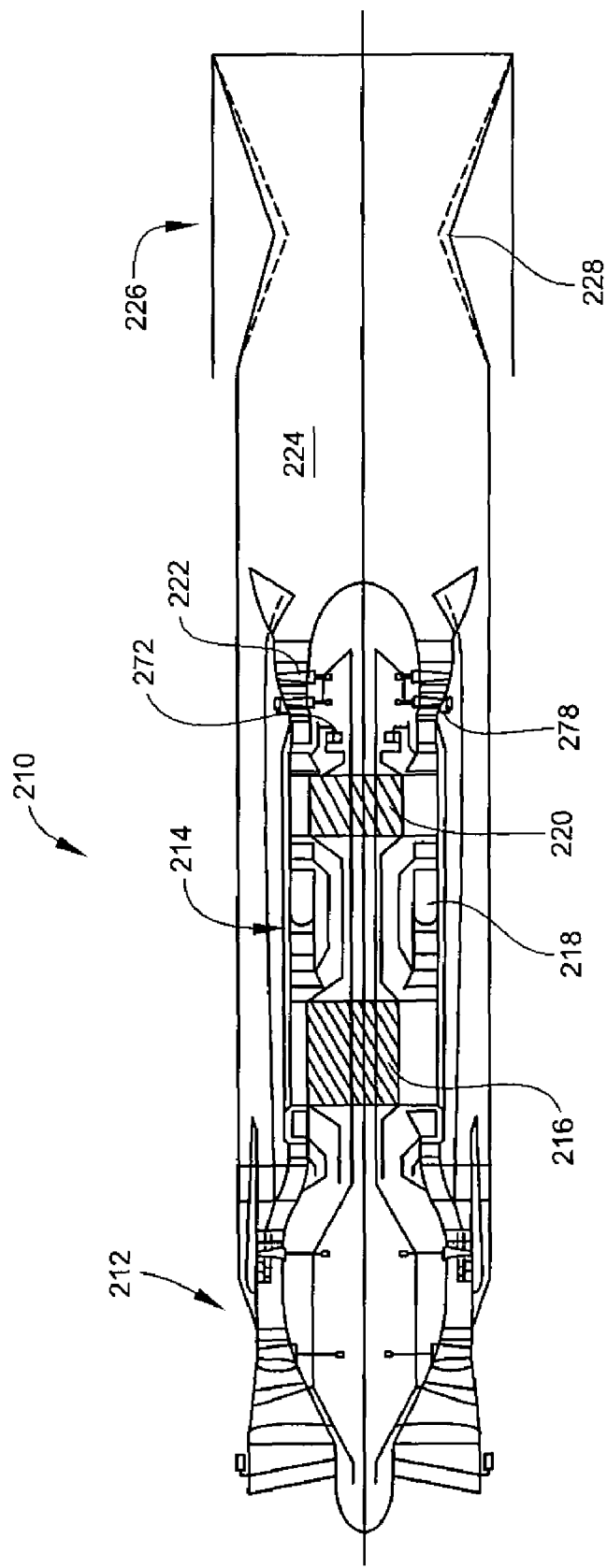
FIG. 5 is a schematic cross-sectional view of a gas turbine engine constructed according to another aspect of the present invention.

FIG. 5 illustrates another alternative convertible engine 210 similar in construction to the convertible engine 110 and having a fan 212, a core 214 including a positive-displacement compressor 216 (such as a worm compressor), combustor 218, and high pressure turbine 220. The fan 212 is driven by a low pressure turbine 222 disposed downstream of the core 214. An exhaust duct 224 is disposed downstream of the low pressure turbine 222, and a convergent-divergent exhaust nozzle 226 is disposed downstream of the exhaust duct 224. The throat 228 of the exhaust nozzle 126 may have a variable area "A8", and if desired an afterburner (not shown) may be incorporated upstream of the exhaust nozzle 226.

The primary difference between the convertible engine 210 and the convertible engine 110 is that the high-pressure turbine 220 is a positive-displacement device of a known type, such as a so-called "worm" turbine. A key aspect of this type of turbine 220, as compared to a prior-art axial-flow turbine, is that it is able to maintain a substantially constant pressure drop while accommodating varying flow rates. the high pressure turbine 220 is interconnected to the low pressure turbine 222 by a gearset 272 which provides control of the speed ratio between the two. The low pressure turbine 222 is provided with variable area LPT nozzles (VATN) 278 which may have their open flow area selectively changed by using an actuator of a known type (not shown), in order to effectuate a change in the operating speed of the engine compressor 216. An advantage of this configuration is that no variable-area hardware is required in the "hot section" of the engine 210, and the gearset 272 will transmit lower power levels than the gearset 172.

Figure 6:
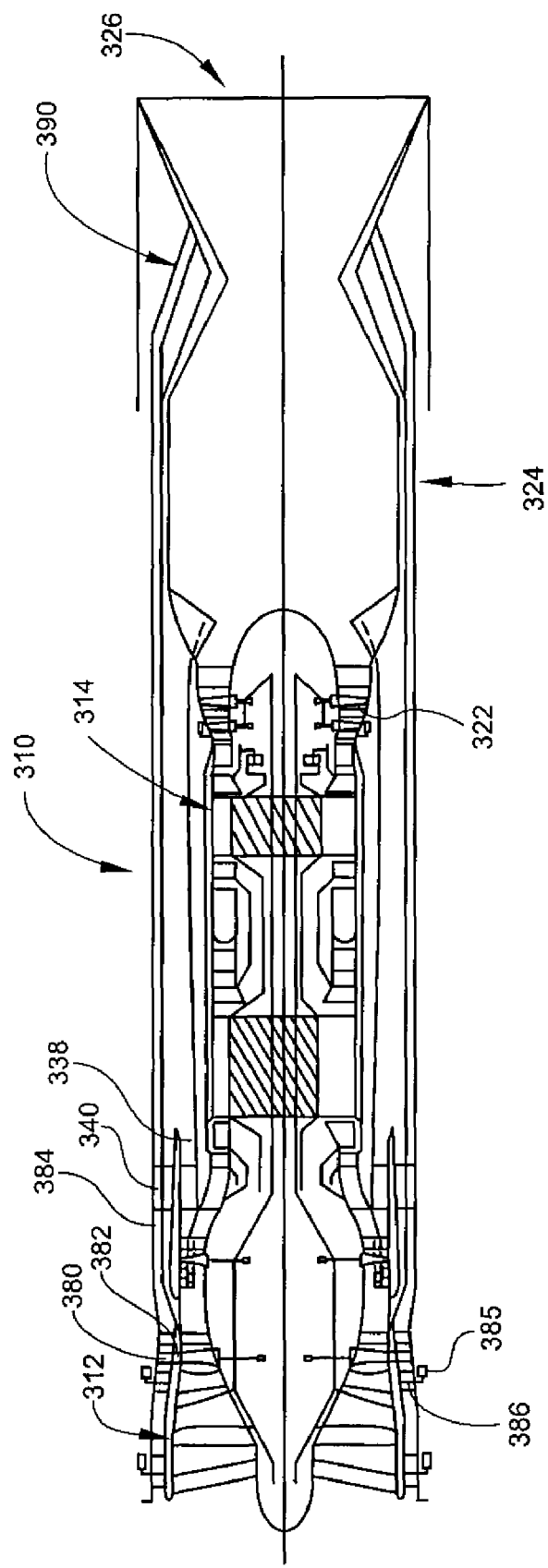
FIG. 6 is a schematic cross-sectional view of a gas turbine engine constructed according to yet another aspect of the present invention.

FIG. 6 illustrates another alternative convertible engine 310 similar in construction to the convertible engine 210 and having a fan 312, a core 314, a low pressure turbine 322, exhaust duct 324, exhaust nozzle 326, inner bypass duct 338, and outer bypass duct 340. The engine 310 includes a supplementary fan, referred to as a "FLADE" stage 380 in the form of a ring of airfoils extending radially outwardly from an annular shroud 382 and driven by the fan 312. The FLADE stage 380 is positioned in a fan outer duct 384 which surrounds the outer bypass duct 330. The FLADE stage 380 provides an additional flow stream at a different flow and pressure ratio that than of the fan 312. Other fan stage counts with possibly FLADE stages on more than one fan blade could also be used, depending on the final selection of fan and FLADE pressure ratios. The FLADE stage flow is sized to provide sufficient bleed air pressure and flow for a selected aircraft bleed-air powered system of a known type (not shown). A row of variable-angle FLADE inlet guide vanes 386, operated by an actuator 388, are moveable between open and closed positions to vary the flow through the FLADE stage 380. A FLADE nozzle 390 is disposed around the exhaust nozzle 326 and is connected to the fan outer duct 384. the FLADE stage discharge exits the FLADE nozzle 390. This flow could be used for cooling the exhaust nozzle 326, for in-flight performance enhancements, and/or to tailor engine inlet flow to minimize inlet spillage and throat bleed drag losses.

The foregoing has described a convertible gas turbine engine. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation, the invention being defined by the claims.

What is claimed is:

1. A gas turbine engine, comprising:
   (a) a first turbomachinery core;
   (b) a second turbomachinery core adjacent to the first core;
   (c) a low pressure turbine disposed downstream of the first and second cores and in flow communication with at least one of the first and second cores;
   (d) a rotating fan disposed upstream of the first and second cores and in mechanical communication with the low pressure turbine;
   (e) at least one inlet control flap disposed downstream of the fan and upstream of the first and second cores, the at least one inlet control flap having at least two positions, wherein:
   a first position permits flow communication between the fan and the first core and prevents flow communication between the fan and the second core; and
   a second position permits flow communication between the fan and the second core and prevents flow communication between the fan and the first core; and
   (f) at least one outlet control flap disposed downstream of the first and second cores and upstream of the low pressure turbine, the at least one outlet control flap having at least two positions, wherein:
   a first position permits flow communication between the first core and the low pressure turbine; and
   a second position permits flow communication between the second core and the low pressure turbine.

2. The gas turbine engine of claim 1 further comprising:
   (a) at least one bypass duct downstream of the fan and surrounding the first and second cores; and
   (b) a mixer downstream of and in flow communication with the at least one bypass duct and the first and second cores.

3. The gas turbine engine of claim 1 further comprising an exhaust nozzle downstream of the low pressure turbine.

4. The gas turbine engine of claim 1 further comprising a core exhaust duct connected in flow communication with each of the cores.

5. The gas turbine engine of claim 1 wherein each of the cores includes, in series flow relationship:
   (a) a compressor;
   (b) a combustor; and
   (c) a high pressure turbine.

6. The gas turbine engine of claim 1 wherein the fan includes:
   (a) a primary section including at least one stage of rotating primary fan blades; and
   (b) a secondary section including at least one stage of secondary rotating fan blades;
   (c) a first bypass duct connected in fluid communication with the fan downstream of the primary section and upstream of the secondary section; and (d) a second bypass duct connected in fluid communication with the fan downstream of the secondary section.

7. The gas turbine engine of claim 6 wherein the secondary section includes:
(a) a plurality of secondary guide vanes disposed upstream of the secondary fan blades, the guide vanes collectively moveable between an open position and a closed position;
(b) a stationary splitter structure downstream of the secondary fan blades and arranged to divide a discharge flow from the secondary fan blades into radially inner, center, and outer flows; and
(c) at least one fan flow control flap downstream of the splitter structure and arranged to direct selected ones of the radially inner, center, and outer flows into the core in respective first and second positions.

8. The gas turbine engine of claim 6 further including a controller for selectively varying a ratio of the first flow that bypasses the cores to the ratio of the first flow that passes through the cores.

* * * * *